United States Patent
Shetty et al.

(10) Patent No.: US 12,045,606 B1
(45) Date of Patent: Jul. 23, 2024

(54) SOFTWARE DEFINED NETWORK FOR SECURE ACCESS

(71) Applicant: Intrado Corporation, Omaha, NE (US)

(72) Inventors: Santhosh Monappa Shetty, Omaha, NE (US); Adeel Sharon, Morrisville, NC (US)

(73) Assignee: Intrado Corporation, Omaha, NE (US)

(*) Notice: Subject to any disclaimer, the term of this patent is extended or adjusted under 35 U.S.C. 154(b) by 662 days.

(21) Appl. No.: 17/028,257

(22) Filed: Sep. 22, 2020

(51) Int. Cl.
*G06F 8/71* (2018.01)
*G06F 8/41* (2018.01)
*G06F 9/455* (2018.01)
*G06F 16/2455* (2019.01)
*G06F 21/62* (2013.01)

(52) U.S. Cl.
CPC .............. *G06F 8/71* (2013.01); *G06F 8/41* (2013.01); *G06F 9/45558* (2013.01); *G06F 16/24552* (2019.01); *G06F 21/6218* (2013.01); *G06F 2009/45562* (2013.01); *G06F 2009/45595* (2013.01)

(58) Field of Classification Search
CPC .......... G06F 8/71; G06F 8/41; G06F 9/45558; G06F 16/24552; G06F 21/6218; G06F 2009/45562; G06F 2009/45595
See application file for complete search history.

(56) References Cited

U.S. PATENT DOCUMENTS

| | | | |
|---|---|---|---|
| 9,817,840 B1* | 11/2017 | Emelyanov | G06F 16/172 |
| 10,686,876 B1* | 6/2020 | Larrew | H04L 67/1014 |
| 2009/0300151 A1 | 12/2009 | Friedman et al. | |
| 2010/0064277 A1 | 3/2010 | Baird et al. | |
| 2012/0311157 A1 | 12/2012 | Erickson et al. | |
| 2013/0174117 A1 | 7/2013 | Watters et al. | |
| 2014/0006354 A1 | 1/2014 | Parkison et al. | |
| 2018/0278680 A1* | 9/2018 | Liu | H04L 67/1097 |
| 2018/0316550 A1 | 11/2018 | Patel et al. | |
| 2019/0028336 A1 | 1/2019 | Coronado et al. | |
| 2019/0104047 A1 | 4/2019 | Tejaprakash et al. | |
| 2019/0327271 A1 | 10/2019 | Saxena et al. | |
| 2020/0036581 A1 | 1/2020 | Pannem et al. | |
| 2020/0169463 A1 | 5/2020 | Kang et al. | |
| 2020/0252416 A1 | 8/2020 | Niv et al. | |
| 2021/0029171 A1 | 1/2021 | Barday et al. | |
| 2021/0133160 A1* | 5/2021 | Craft | G06F 16/148 |

* cited by examiner

Primary Examiner — Mohammad W Reza

(57) ABSTRACT

One example method of operation may include executing a script to create a software defined network, retrieving a build from a remote data repository, storing a cached version of the build in a virtual database based on instructions in the script, identifying a request to access the remote data repository, and redirecting the request to the cached version of the build.

20 Claims, 8 Drawing Sheets

SOFTWARE DEFINED NETWORK FOR SECURE ACCESS

CROSS-REFERENCE TO RELATED APPLICATION

This application is related to U.S. non-provisional patent application Ser. No. 17/028,200, filed on Sep. 22, 2020, entitled, "SOFTWARE DEFINED NETWORK FOR APPLICATION NETWORK," now U.S. Pat. No. 11,146,458, issued on Oct. 12, 2021, each incorporated herein by reference in its entirety.

BACKGROUND

Conventionally, software development may be the product of many individual workstations and corresponding user profiles which accessed and contributed to the development process. Most information regarding the development process is easily tracked/logged by a management entity, such as a management server. As users contribute to a software build/application, the lines of code, time spent and errors identified (i.e., run-time errors) during a compilation procedure may be used to determine whether one or more user profiles were a participant to a portion of the code that is not operational and/or whether the user profiles have fulfilled their contribution expectations.

In the example with multiple sites operating similar software builds, those software builds may be identified and tested prior to updating other sites to ensure errors are resolved prior to attempting an upgrade or modification to other existing sites.

In other examples of software development, continuous integration (CI) is a process in which developers integrate new codes into a shared repository several times a day. This is a more robust approach than the traditional approach of a developer building new code in isolation and then integrate the data into the main repository at the end of the project lifecycle. The primary objective is to detect any integration bugs at the initial stage so they can be rectified quickly. This approach triggers a new build whenever a new code merges with the existing main repository. Test runs are performed against these new builds to check for any errors.

At the end of CI begins continuous delivery (CD), which ensures whether to automate the software delivery process and commit to deliver the integrated code into the production stage without any bugs or delay. This implementation process helps developers merge the new code with the main branch consistently so they can build an instant software-ready product. The CD process is responsible for checking the quality of the code and performing tests to check whether it can release the functional build to the production environment.

Continuous deployment (CDE) is a critical part of the automation process which occurs at this stage of the delivery pipeline. Whenever there is an important change in the code, the corresponding build and deployment occur simultaneously. This is achieved through a continuous deployment process where live deployment of changes is performed for every code modification that passes through the CI stage. During this stage, there is no manual intervention right from the initial code until the code is in the production stage. The CI/CD pipeline may include the moving of compiled code from one development environment to another.

Another common process in software development is referred to infrastructure as code (IaC), which is the process of managing and provisioning computer data centers through machine-readable definition files, rather than physical hardware configurations or interactive configuration tools. The informational technology (IT) infrastructure may include both physical equipment such as bare-metal servers as well as virtual machines and associated configuration resources. The definitions may be in a version control system. It can use either scripts or declarative definitions, rather than manual processes, although declarative approaches are more common. Known application tools may include TERRAFORM, ANSIBLE and PUPPET.

Growing popularity in software defined networks (SDNs) has permitted SDNs to be setup and implemented in the cloud to assist with wide-scale network management that enables dynamic, programmatically efficient network configuration in order to improve network performance, access, monitoring, etc. The SDN may offer optimization over the conventional static architectures of traditional networks which are decentralized and complex.

SUMMARY

Example embodiments of the present application provide at least a method that includes one or more of identifying a script enabling access to a software management platform, creating one or more virtual devices in a software defined network based on virtual device requirements identified in the script, loading a software build identified in the script on a virtual database, and authorizing one or more devices of a first network to access the software defined network and the one or more virtual devices.

Another example embodiment may include an apparatus that includes a processor configured to perform one or more of identify a script enabling access to a software management platform, create one or more virtual devices in a software defined network based on virtual device requirements identified in the script, load a software build identified in the script on a virtual database, and authorize one or more devices of a first network to access the software defined network and the one or more virtual devices.

Still yet another example embodiment may include a non-transitory computer readable storage medium configured to store instructions that when executed causes a processor to perform one or more of identifying a script enabling access to a software management platform, creating one or more virtual devices in a software defined network based on virtual device requirements identified in the script, loading a software build identified in the script on a virtual database, and authorizing one or more devices of a first network to access the software defined network and the one or more virtual devices.

Still yet another example embodiment may include a method that includes one or more of executing a script to create a software defined network, retrieving a build from a remote data repository, storing a cached version of the build in a virtual database based on instructions in the script, identifying a request to access the remote data repository, and redirecting the request to the cached version of the build.

Still yet another example embodiment may include an apparatus that includes a processor configured to execute a script to create a software defined network, retrieve a build from a remote data repository, store a cached version of the build in a virtual database based on instructions in the script, identify a request to access the remote data repository, and redirect the request to the cached version of the build.

Still yet another example embodiment may include a non-transitory computer readable storage medium configured to store instructions that when executed cause a processor to perform one or more of executing a script to create a software defined network, retrieving a build from a remote data repository, storing a cached version of the build in a virtual database based on instructions in the script, identifying a request to access the remote data repository, and redirecting the request to the cached version of the build.

DETAILED DESCRIPTION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in one or more embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide for methods, processes, devices, systems and non-transitory computer readable mediums which execute instructions to provide operations to enable a software production process via a software defined network (SDN). In one example, the SDN is operated and managed via a cloud service of remote servers which enable software defined elements to be created, managed and used to complement the software development cycle.

Figure 1:
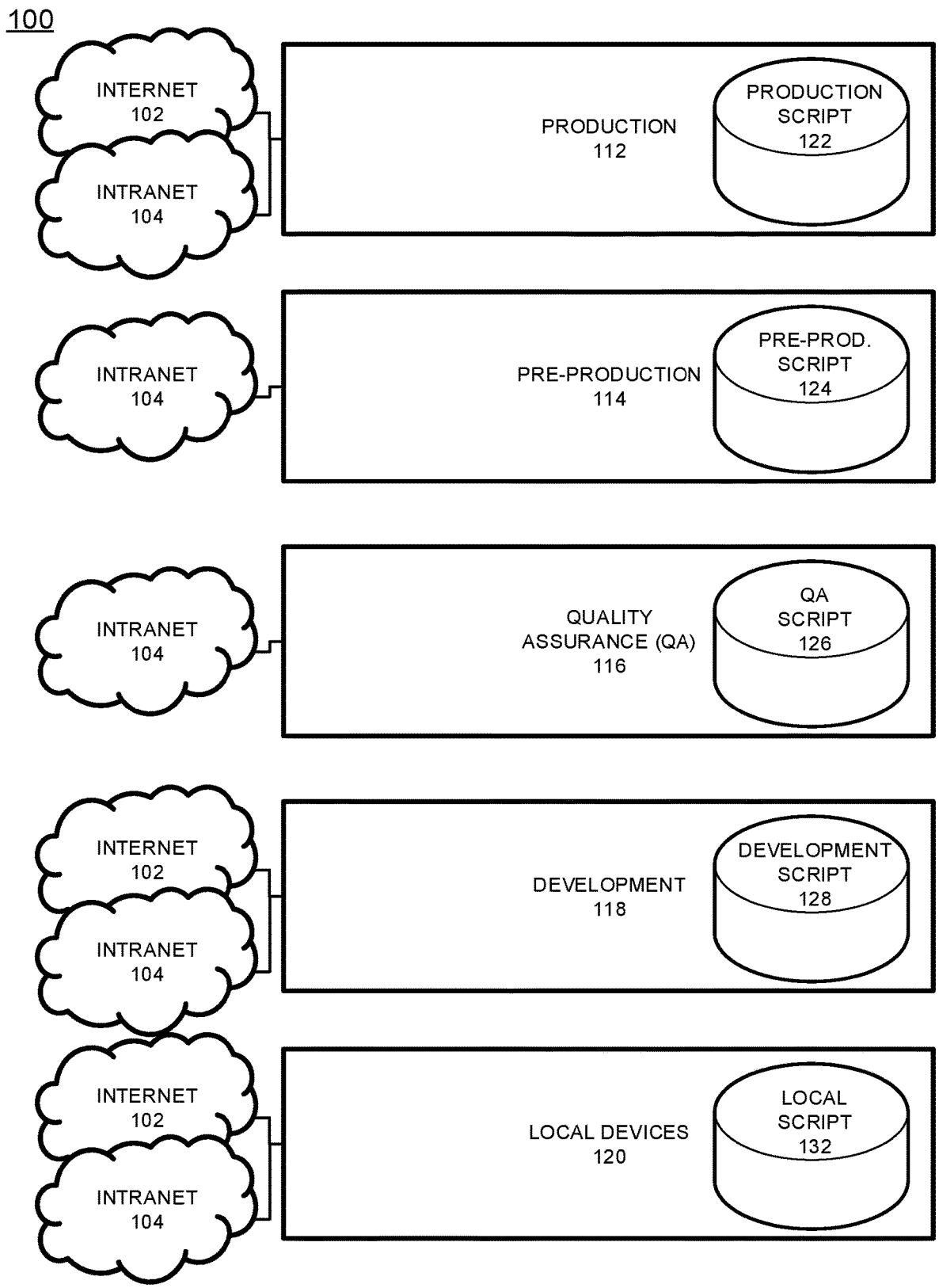
FIG. 1 illustrates an example conventional software product development environment for managing development according to example embodiments.

FIG. 1 illustrates an example conventional network configuration for managing software development according to example embodiments. Referring to FIG. 1, the system configuration 100 includes common types of development environments each with their own script for configuring code and devices which will launch the software code builds. The cycle may include one or more local devices 120, such as local devices 120 which will launch their own device script 132, and may have access to the Internet 102 and/or an enterprise Intranet 104. The development component 118 may have its own script 128 to launch the software builds and configure the hardware necessary to receive and process development information. The quality assurance (QA) component 116 may have its own script 126 to launch the software builds and configure the hardware necessary to receive and process development information for performing QA tests and procedures. The pre-production component 114 may have its own script 124 to launch the software builds and configure the hardware necessary to receive and process pre-production information. The production component 112 may have its own script 122 to launch the software builds and configure the hardware necessary to receive and process pre-production information. Each of the components have their own script and the hardware elements used present security risks and require customized configurations.

According to example embodiments, using a system architecture where each software development environment is isolated but managed by a common software defined network (SDN) and a common automation script or fewer overall scripts than conventional approaches, and which create the environments (e.g., ANSIBLE, CHEF, PUPPET, etc.) may provide an optimal and centrally managed approach to development. The scripts generally initiate and provision the environment with hardware/software modules and certain repositories, software builds, compilers, languages, etc. The script may enable all the development tools and requirements to be operational for remote access by any production cycle sector (e.g., production, pre-production, quality assurance and development). A SDN may be a set of interconnected virtual devices, such as a virtual machine, virtual databases, virtual servers, etc., which operate in the cloud and offer enterprise services to clients which solicit those services. For example, a SDN may have a set of rules on which users can access an environment, how much traffic may be utilized in such an environment, among other attributes of the SDN.

In one example, the SDN may offer security measures as well by limiting exposure to the Internet and acting as a proxy which replicates Internet access by storing remote directories, such as a particular GITHUB development environment in a local virtual space during development. Updates over the Internet may occur once the environment is disabled to avoid access from undesirable sources. In the event that an unknown IP address has attempted to access the SDN, the access may be limited and may result in a rejection to unregistered entities unknown to the SDN.

One of the most optimal approaches to utilizing the SDN to limit the differences which occur to separated individual environments is via the use of multi-environment scripts. For example, instead of having each software development team use their own scripts, the SDN may store a single script that performs all necessary actions required by more than one or two or more environments. For example, one script may be used for two environments and another may be used for two more environments. This way a single processing platform, security interface, database, and other attributes may be setup in the SDN and used by more than one remote environment including different teams of end user devices accessing and contributing changes, testing and other actions to the development cycle.

Certain environments require a higher level of security than others, for example, the teams which modify the code, and add to the code may require a higher level of security than other teams. A team which tests the code or performs integration with the code may not require the same level of security since they are only receiving compiled and/or final versions of the code and cannot make changes to the code builds. Therefore, bundling certain teams into groups of two or three groups which share a common script may provide a way to enable multiple levels of access while preserving fewer scripts to be created and run each time a team accesses the software production cycle.

Figure 2:
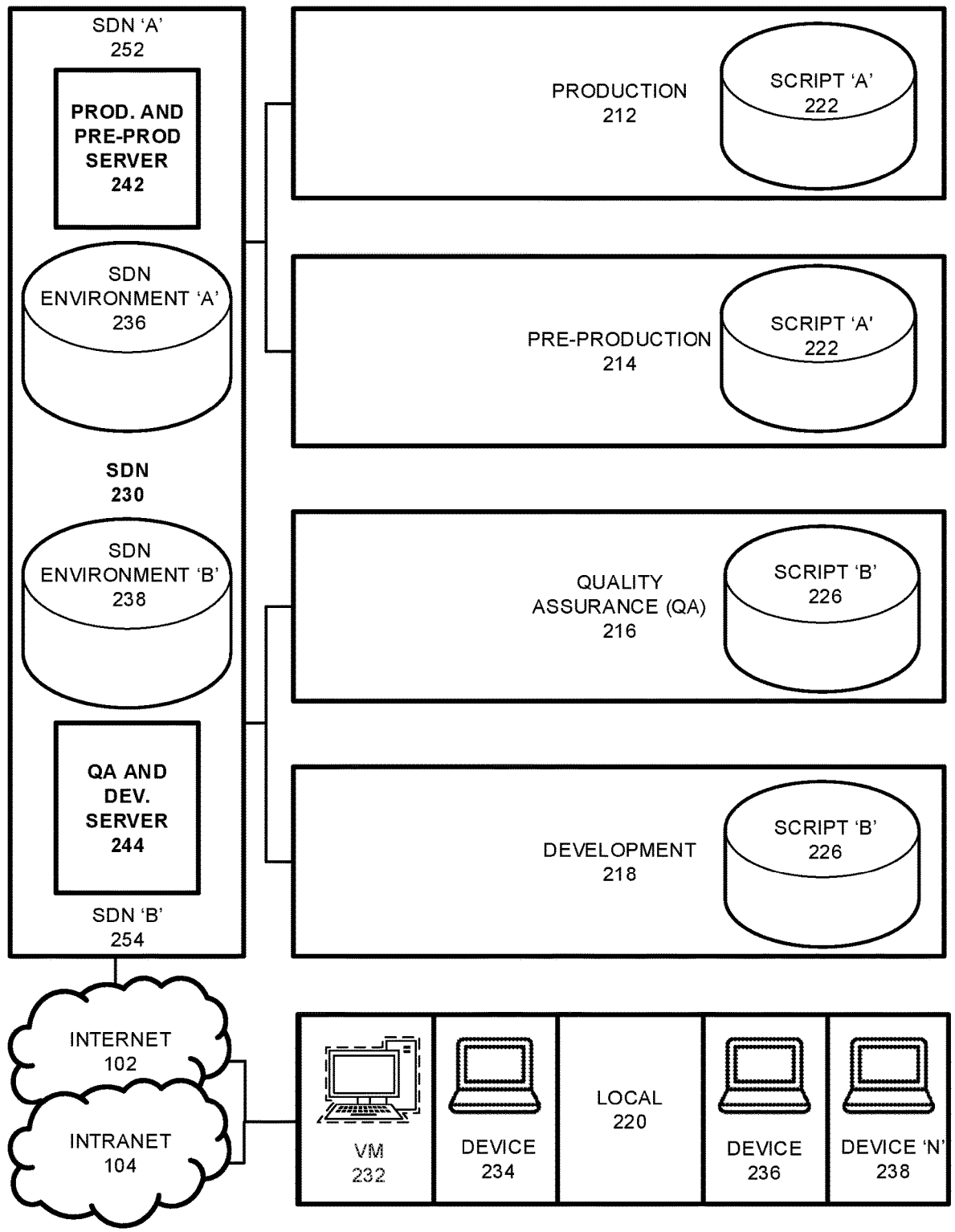
FIG. 2 illustrates an example software product development environment for managing development according to example embodiments.

FIG. 2 illustrates an example software product development environment for managing development according to example embodiments. Referring to FIG. 2, the configuration 200 includes a software defined network (SDN) 230 which is used to create a system configuration environment for various software development environments. For example, the SDN 230 may initiate a database 236 and a virtual computing server 242 in response to initiating a script 'A' 222 for a pre-production 214 and/or a production module 212, which can then share the same SDN environment as managed by the script 222. In one example, as the script is loaded by the cloud server(s), the dedicated server module 242 and database 236 are created as virtual elements in the SDN cloud environment. Also, a common software build may be retrieved from a data repository, such as GITHUB via the Internet/Intranet connection 102/104. The VM 232 may be an assigned entity that is used to interface with end user devices, such as a personal computer 234 as part of the local level of development.

In a further level of SDN architecture used to support the software development process, the QA module 216 and development module 218 may utilize another common script 'B' 226 which may invoke the creation of a specific server module 244 and/or database 238 which is enabled to support QA 216 and development 218 environments. The access performed via one or more end user devices 234-238 may be enabled via a virtual machine (VM) installed on the one or more local devices 220.

In one example, the two sub-network SDNs 'A' 252 and 'B' 254 and their respective environments are each enabled by two separate scripts which are stored on local machines and uploaded when modifications to the SDNs are necessary. The scripts may define how many and what types of virtual devices are to be enacted on the SDNs, which devices have access, which IP addresses are permitted to access the network devices and other parameters, such as whether access to the Intranet is permitted, access to the Internet is permitted, etc. One approach is to redirect Internet access requests to remote sites, such as GITHUB or DOCKER to locations within the Internet which have already accessed and loaded the information from the repositories of those Internet sites. Each SDN will have its own intercepting and redirecting rules as defined by the scripts for each environment of the SDN.

Figure 3:
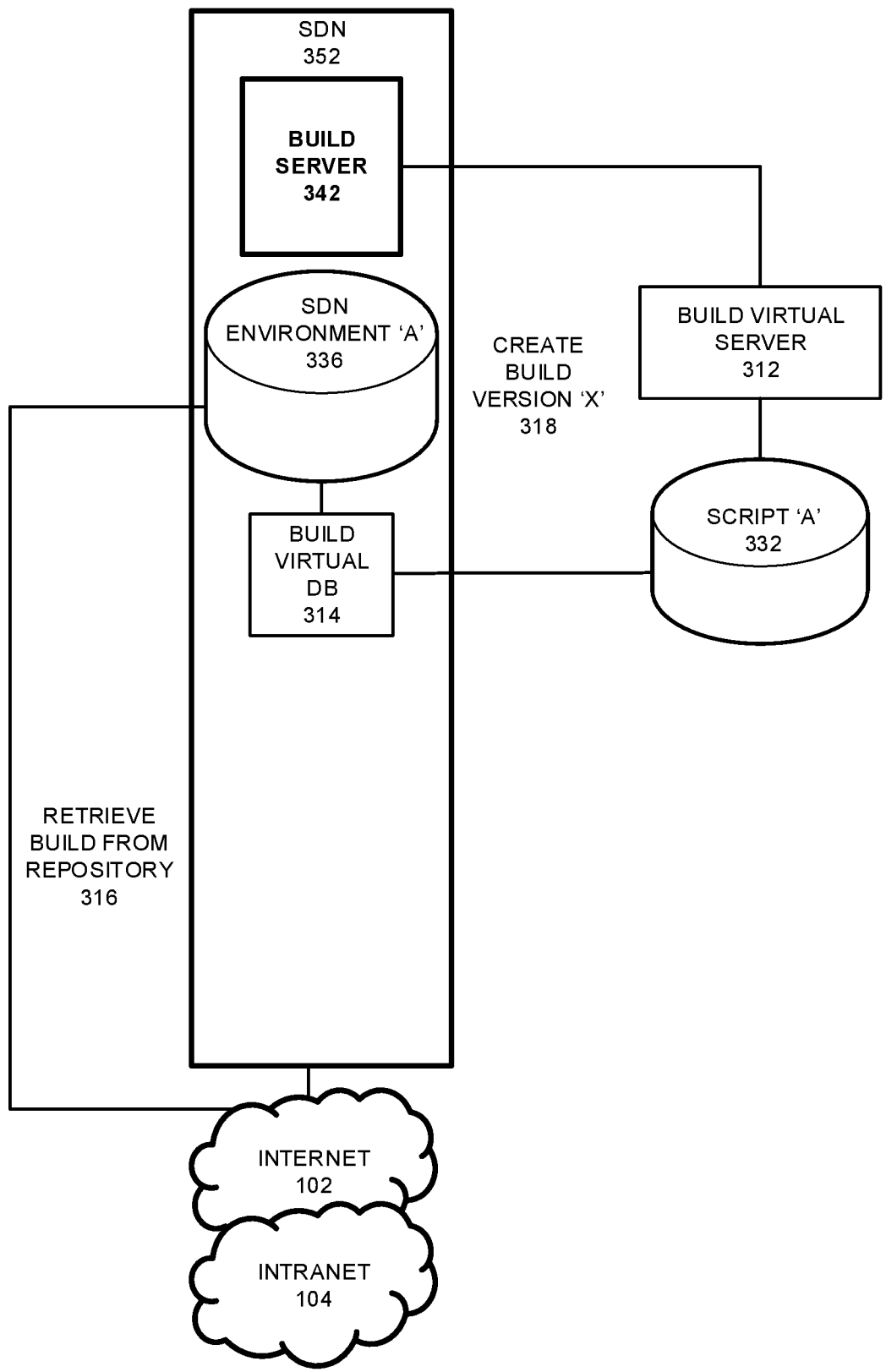
FIG. 3 illustrates an example of using a script to create a software defined network infrastructure for secure access to remote data according to example embodiments.

FIG. 3 illustrates an example of using a script to create a software defined network infrastructure for secure access to remote data according to example embodiments. Referring to FIG. 3, the example configuration 300 includes a script 'A' 332 being accessed and executed to perform various SDN operations for creating a SDN-based environment 352. In one example, the script 332 may be invoked to build 312 a virtual server 342 in the cloud-based SDN 352. The script may also invoke a build 314 of a virtual DB 336. Also, a particular software application build may be created 318 based on the script requirements. The build may first be retrieved 316 from a repository such as GITHUB over an Internet connection. The repository may then be placed in the virtual DB 336 for use by the project teams from various environments.

During a script execution, the virtual server 342, the virtual database 336, the build being retrieved and used are not available until the execution cycle. The SDN components are identified in the script, created, populated (i.e., scripts, access information) and accessed by remote user devices to perform various software development operations. Once the operations are completed, the entire SDN 352 and its environment may be collapsed until re-execution of the build at a later time.

In one example, emergency services may utilize such a development environment to implement an authorized platform for testing and utilizing a software code build. When an emergency service is used, the security to prevent hacking and unwanted users must ensure that there is no unauthorized access which can become a larger threat over time from a static development environment. This SDN creation and destruction approach provides a secretive working environment that only those users who are aware of the recent access and SDN creation process can access.

Figure 4:
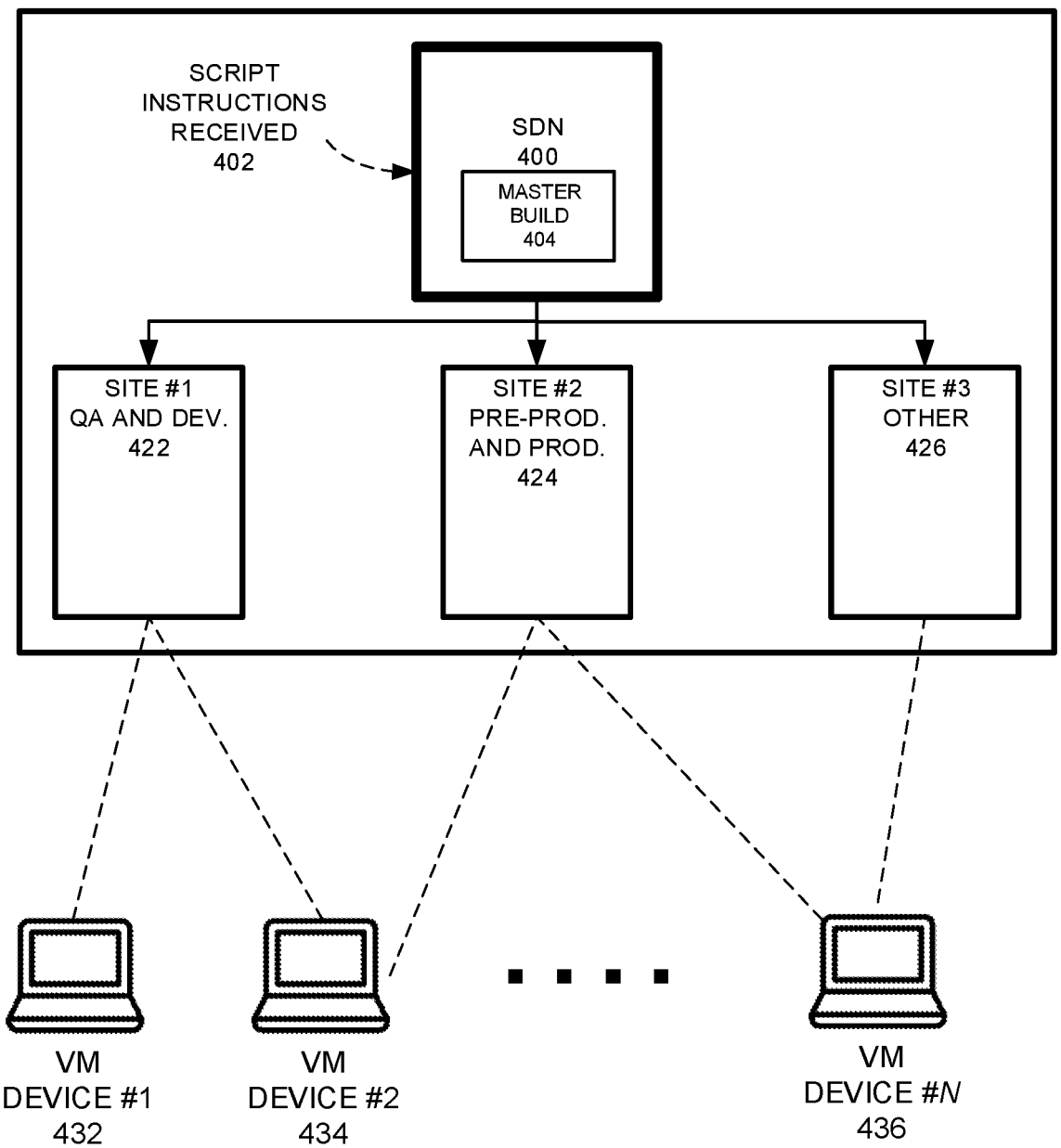
FIG. 4 illustrates an example software defined network which uses a script to enable access to a software build for multiple environments according to example embodiments.

FIG. 4 illustrates an example software defined network which uses a script to enable access to a software build for multiple environments according to example embodiments. Referring to FIG. 4, the system includes a SDN 400 which is created based on the instructions in the executed script 402. The script may require the SDN 400 to setup a master build 404 in a data repository which is accessible by all environments seeking access to the software development system. The build 404 may be received and stored upon creation of the SDN 400 or within a certain time period thereafter. The build may have a time to live (TTL), which may be based on an access regiment, such as once per hour with a maximum 24 hour window before it automatically is saved to a remote location and deleted from the SDN 400. The TTL may also be based on access to the site servers, such as those virtual servers which may be created to support access environment sites 422, 424 and 426.

For example, a first virtual site identified by a server/database may be used to permit QA and development team members 422 to access the SDN and master build for development purposes. The second site may offer the pre-production and production sites 424 to separately access the same SDN and build 404. Other sites 426 may also be enabled in this system. Various virtual machines 432-436 may be setup to include a component on the SDN and another component on a remote user device co-located where the environment members are located.

Figure 5A:
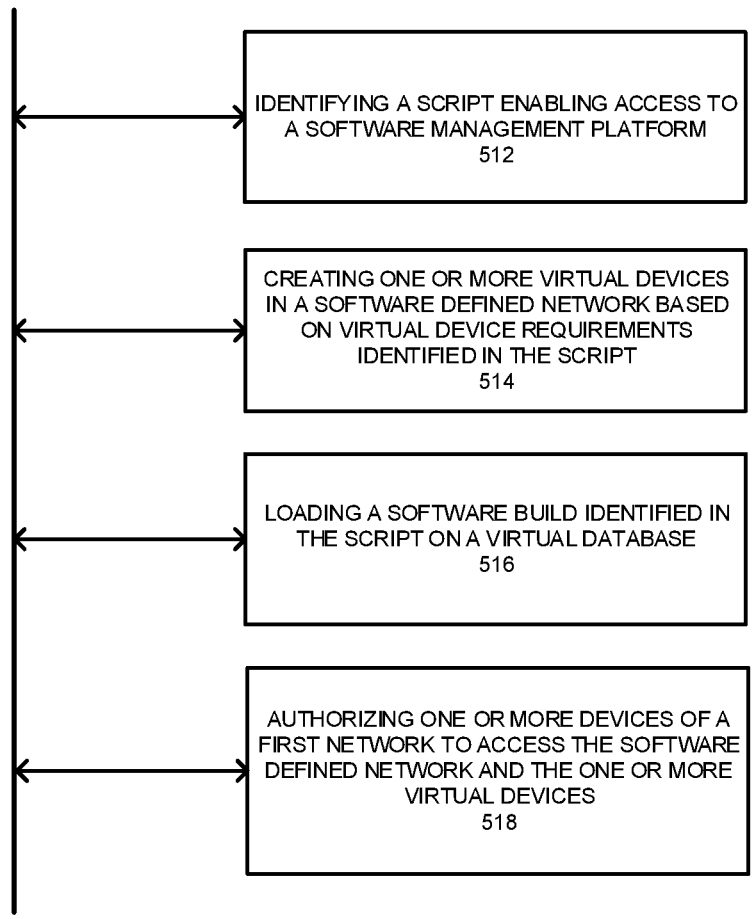
FIG. 5A illustrates an example process for creating a software defined network based on script instructions according to an example embodiment.

FIG. 5A illustrates an example process for creating a software defined network based on script instructions according to an example embodiment. Referring to FIG. 5A, the process 500 provides identifying a script enabling access to a software management platform 512. The script may be setup for execution by any of two more environments which are seeking access to a common SDN which enables reusing a common script. The script variables may enact a SDN environment with certain core elements (virtual elements) used by more than one environment. The process may also include creating one or more virtual devices in a software defined network based on virtual device requirements identified in the script 514. In this operation, the script may have virtual device requirements which must be retrieved and setup when the script is executed. The script may specify a number of databases, which entities (e.g., profiles, IP addresses, device IDs) are permitted to use those databases and other devices. The process may also include loading a software build identified in the script on the virtual database 516 and authorizing one or more devices of a first network to access the software defined network and the one or more virtual devices 518. In this example, the build may be stored and then retrieved from a remote repository, such as GITHUB in order to create the environment. The script may enact the SDN to retrieve the build, copy the build and store the updated build on the database and close all externals ports so other users cannot access the Internet or remote networks while accessing the build.

In another example, the process may perform authorizing one or more additional devices to access the software defined network and the one or more virtual devices, and the one or more additional devices are assigned to a second network that is in a remote location from the first network. The two or three or more networks represent different code development environments, such as a local environment, development, quality assurance, pre-production and production.

The process may also include storing updates received from the one or more devices and the one or more additional devices on the virtual database created in the software defined network. As changes are made to the software code build, the updates may be stored locally prior to updating a remote site, such as the GITHUB repository which has been temporarily separated from the active environment of the SDN for security purposes. The process may also include identifying an additional script to enable access to an additional software management platform. For example, one script may provide a SDN customized for two or more environments, however, additional scripts may be used to provide customized SDNs for other environments. During this process, the system may also perform creating one or more additional virtual devices in an additional software defined network based on additional virtual device requirements identified in the additional script, and authorizing one or more devices of a third network to access the additional software defined network and the one or more additional virtual devices.

The one or more virtual devices and the one or more additional virtual devices may include any number of virtual machines virtual databases and/or virtual servers, which are named and used during the development cycle and which may be removed after the development script has been shut down or erased. The process may also include receiving a request for a remote site, and redirecting the request to a local repository with a cached version of the remote site. The process may further include intercepting the request based on a command in the script. The request may be received from a local device to access a particular remote site, such as one identified from the script or received from a command line input command during access to the SDN environment. Any of those requests may be intercepted and re-routed to the build or other content stored in the virtual database.

Figure 5B:
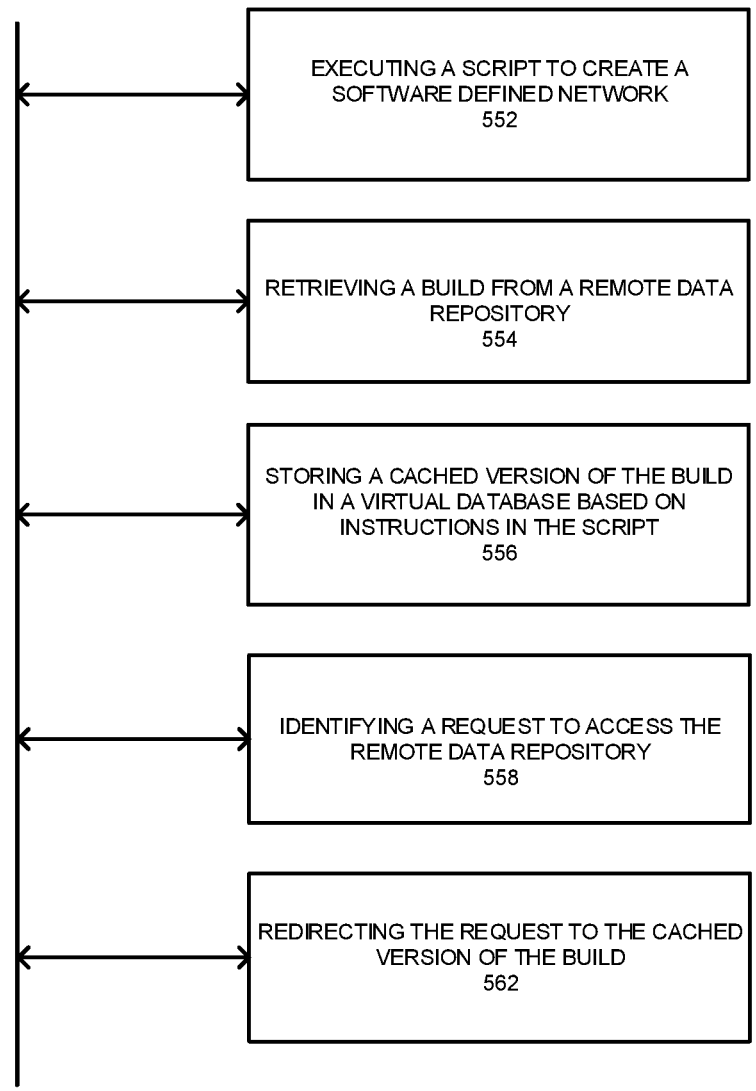
FIG. 5B illustrates an example process for managing software builds in a software defined environment based on script instructions according to an example embodiment.

FIG. 5B illustrates an example process for managing software builds in a software defined environment based on script instructions according to an example embodiment. Referring to FIG. 5B, the process 550 may provide an approach to build Intranet repositories and intercept calls. For example, the process may perform executing a script to create a software defined network 552 and retrieving a build from a remote data repository 554. The script may specify where the build is to be retrieved and may identify the source address of the repository and instructions on accessing the build. The process may also include storing a cached version of the build in a virtual database based on instructions in the script 556, identifying a request to access the remote data repository 558, and redirecting the request to the cached version of the build 562.

The process may also include loading the build on the virtual database, and authorizing one or more devices of a first network to access the virtual database, and storing updates received from the one or more devices and the one or more additional devices on the virtual database. The actions taken to modify the build may be received and processed to ensure no external sites are reached via the security features which replicate the remote repositories via a local cache. The process may also include creating the virtual database in the software defined network based on virtual device requirements identified in the script. The script may store various virtual device requirements, such as a number of devices, a memory and storage size of the virtual devices, etc. Once the access has been revoked the entire SDN may be collapsed and the dedicated virtual devices may be removed. The process may also include invoking creation of a virtual machine, the virtual database and a virtual server based on instructions in the script or any other script instruction. The device may also include executing a second script, and creating a second software defined network based on instructions in the second script and the software defined network and the second software defined network are maintained in a remote cloud site.

Figure 6:
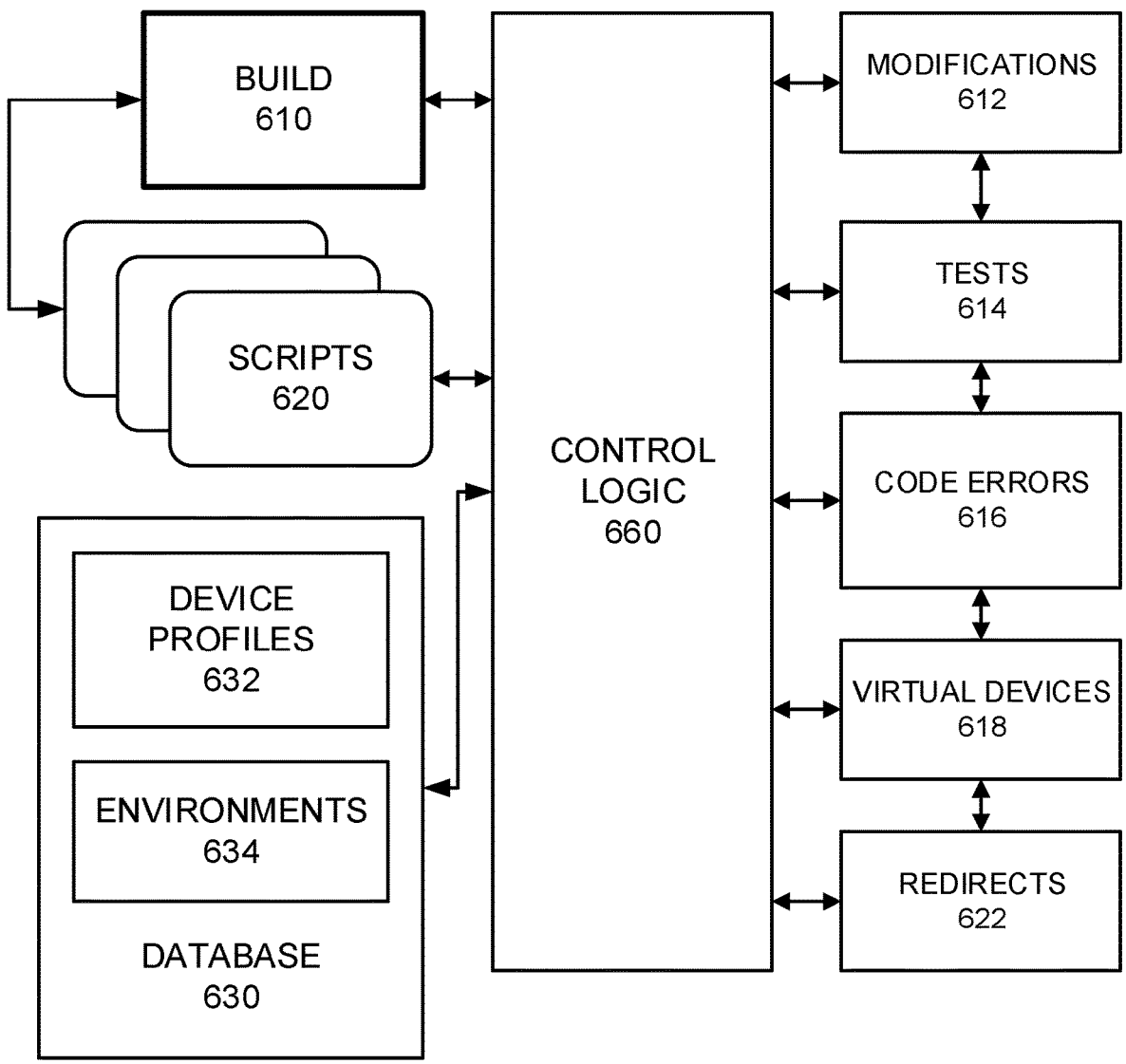
FIG. 6 illustrates an example logic process diagram of input and output parameters which are processed during a procedure according to example embodiments.

FIG. 6 illustrates an example logic process diagram of input and output parameters which are processed during a procedure according to example embodiments. Referring to FIG. 6, the example system 600 may include a control logic module 660 which receives various inputted data, such as a software build 610, scripts 620 and other information to store in the virtual database 630, including device profiles 632 of development environments 634. The output may include any changes or modifications to the build 612, test results 614 from testing processes, code errors 616 from code execution and compiling, virtual devices 618 which are created from the script instructions and any redirect commands 622 to avoid remote sites and unsecure environments.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example network element 700, which may represent any of the above-described network components of the other figures.

Figure 7:
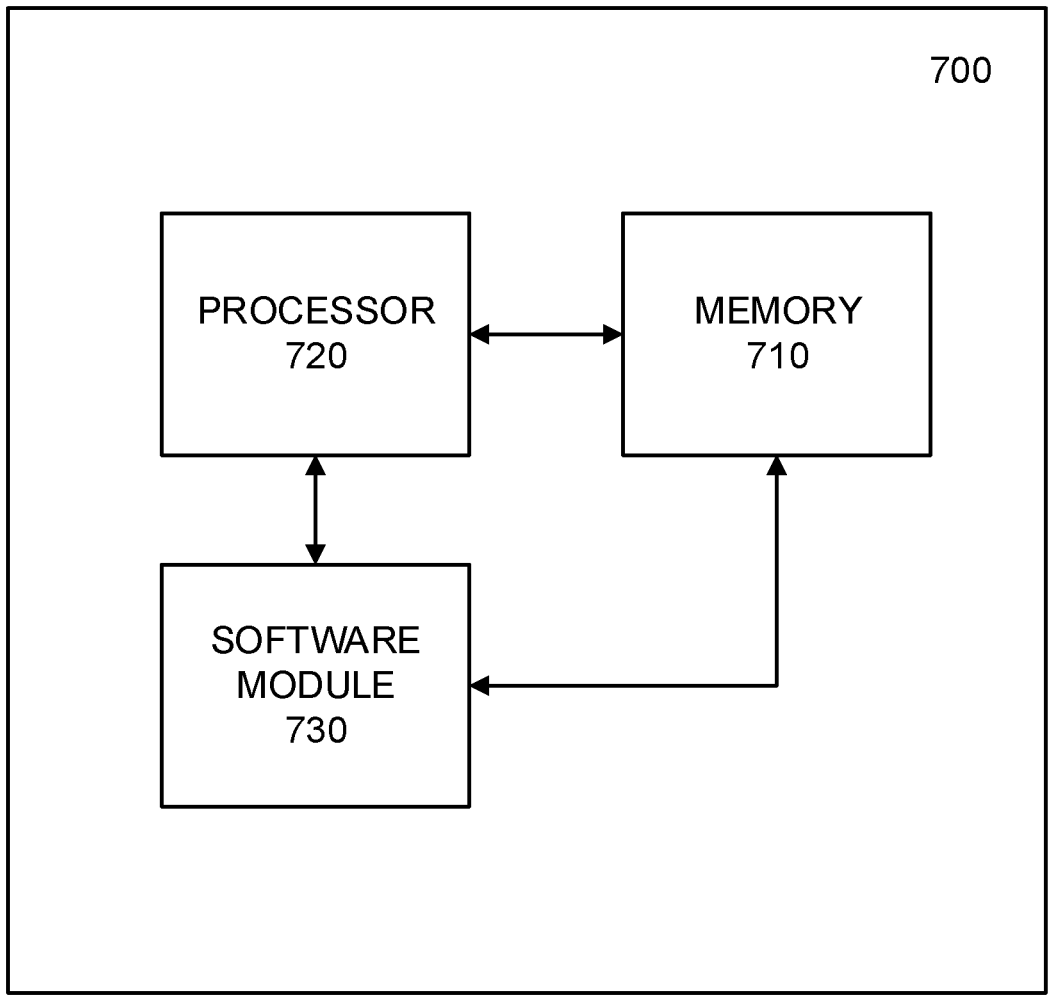
FIG. 7 illustrates an example network entity device configured to store instructions, software, and corresponding hardware for executing the same, according to example embodiments of the present application.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. The computer readable medium may be a non-transitory computer readable medium that includes tangible hardware components in addition to software stored in memory. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
executing a script to create a software-defined network (SDN), wherein the script specifies a source address of a remote data repository storing a software build and instructions for accessing the software build from the remote data repository;

retrieving the software build from the remote data repository;

storing the software build in a virtual database in the SDN based on the instructions, wherein the virtual database is created using the script;

identifying a request to access the software build in the remote data repository; and redirecting the request to the software build in the virtual database.

2. The method of claim 1, comprising:

authorizing one or more devices of a first network to access the virtual database.

3. The method of claim 2, comprising:

storing updates received from the one or more devices in the virtual database.

4. The method of claim 1, comprising:

creating the virtual database in the SDN based on virtual device requirements identified in the script.

5. The method of claim 4, comprising:

invoking creation of a virtual machine, the virtual database, and a virtual server based on instructions in the script.

6. The method of claim 1, comprising:

executing a second script that is different than the script; and creating a second SDN based on instructions in the second script.

7. The method of claim 6, wherein the SDN and the second SDN are maintained in a remote cloud site.

8. An apparatus comprising:

a processor configured to:

execute a script to create a software-defined network (SDN), wherein the script specifies a source address of a remote data repository storing a software build and instructions for accessing the software build from the remote data repository;

retrieve the software build from the remote data repository;

store the software build in a virtual database in the SDN based on the instructions, wherein the virtual database is created using the script;

identify a request to access the software build in the remote data repository; and redirect the request to the software build in the virtual database.

9. The apparatus of claim 8, wherein the processor is further configured to:

authorize one or more devices of a first network to access the virtual database.

10. The apparatus of claim 9, wherein the processor is further configured to:

store updates received from the one or more devices in the virtual database.

11. The apparatus of claim 8, wherein the processor is further configured to:

create the virtual database in the SDN based on virtual device requirements identified in the script.

12. The apparatus of claim 11, wherein the processor is further configured to:

invoke creation of a virtual machine, the virtual database, and a virtual server based on instructions in the script.

13. The apparatus of claim 8, wherein the processor is further configured to:

execute a second script that is different than the script; and create a second SDN based on instructions in the second script.

14. The apparatus of claim 13, wherein the SDN and the second SDN are maintained in a remote cloud site.

15. A non-transitory computer-readable storage medium configured to store instructions that, when executed by a processor, cause the processor to perform:

executing a script to create a software-defined network (SDN), wherein the script specifies a source address of a remote data repository storing a software build and instructions for accessing the software build from the remote data repository;

retrieving the software build from the remote data repository;

storing the software build in a virtual database in the SDN based on the instructions, wherein the virtual database is created using the script;

identifying a request to access the software build in the remote data repository; and redirecting the request to the software build in the virtual database.

16. The non-transitory computer-readable storage medium of claim 15, wherein the instructions further cause the processor to perform:

authorizing one or more devices of a first network to access the virtual database.

17. The non-transitory computer-readable storage medium of claim 16, wherein the instructions further cause the processor to perform:

storing updates received from the one or more devices in the virtual database.

18. The non-transitory computer-readable storage medium of claim 15, wherein the instructions further cause the processor to perform:

creating the virtual database in the SDN based on virtual device requirements identified in the script.

19. The non-transitory computer-readable storage medium of claim 18, wherein the instructions further cause the processor to perform:

invoking creation of a virtual machine, the virtual database, and a virtual server based on instructions in the script.

20. The non-transitory computer-readable storage medium of claim 15, wherein the instructions further cause the processor to perform:

executing a second script that is different than the script; and creating a second SDN based on instructions in the second script, wherein the SDN and the second SDN are maintained in a remote cloud site.

* * * * *